(12) United States Patent
Peters et al.

(10) Patent No.: US 10,629,189 B2
(45) Date of Patent: *Apr. 21, 2020

(54) AUTOMATIC NOTE TAKING WITHIN A VIRTUAL MEETING

(71) Applicant: International Business Machines Corporation, Armonk, NY (US)

(72) Inventors: Edwin W. Peters, Irving, TX (US); Sherry L. Platek, Clarksville, TN (US); Nitty T. Pulikan, Irving, TX (US); Balaji Ranganathan, Plano, TX (US); Liviu Rodean, Hilliard, OH (US); Balasubramanian Sivasubramanian, Austin, TX (US); Eric Woods, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/216,682

(22) Filed: Mar. 17, 2014

(65) Prior Publication Data

US 2014/0278377 A1  Sep. 18, 2014

Related U.S. Application Data

(63) Continuation of application No. 13/839,038, filed on Mar. 15, 2013.

(51) Int. Cl.
*G10L 15/18* (2013.01)
*G06F 16/34* (2019.01)
*H04L 12/18* (2006.01)

(52) U.S. Cl.
CPC ........ *G10L 15/1822* (2013.01); *G06F 16/345* (2019.01); *H04L 12/1831* (2013.01)

(58) Field of Classification Search
CPC ..................... G06F 17/30719; H04L 12/1831
(Continued)

(56) References Cited

U.S. PATENT DOCUMENTS 5,065,309 A    11/1991  Putnam et al.
5,717,869 A     2/1998  Moran et al.
(Continued)

FOREIGN PATENT DOCUMENTS

CN    102388379 A    3/2012
CN    102572372 A    7/2012
(Continued)

OTHER PUBLICATIONS

Harashima, D. et al., "Development and Evaluation of a Minutes System Focusing on Importance in a Meeting," Proc. of 18th Int'l. Conf. on Advanced Information Networking and Applications, AINA 2004, vol. 2, pp. 293-298, Mar. 29-31, 2004 [retrieved Feb. 18, 2013], retrieved from the Internet: <http://dl.acm.org/citation.cfm?id=977529&preflayout=flat>, 31 pgs.
(Continued)

*Primary Examiner* — Douglas Godbold
(74) *Attorney, Agent, or Firm* — Cuenot, Forsythe & Kim, LLC

(57) ABSTRACT

Arrangements relate to automatically taking notes in a virtual meeting. The virtual meeting has meeting content that includes a plurality of meeting content streams. One or more of the meeting content streams is in a non-text format. The one or more meeting content streams in a non-text format can be converted into text. As a result, the plurality of meeting content streams is in text format. The text of the plurality of meeting content streams can be analyzed to identify a key element within the text. Consolidated system notes that include the key element can be generated.

10 Claims, 3 Drawing Sheets

200

Converting the one or more meeting content streams in a non-text format into text, whereby the plurality of meeting content streams are in text
205

Analyzing the text of the plurality of meeting content streams to identify a key element therein
210

Generating consolidated system notes that includes the key element
215

(58) Field of Classification Search
USPC .......................................... 704/1, 231, 275
See application file for complete search history.

(56) References Cited

U.S. PATENT DOCUMENTS

| | | | |
|---|---|---|---|
| 6,018,346 | A | 1/2000 | Moran et al. |
| 6,975,983 | B1* | 12/2005 | Fortescue et al. ............... 704/9 |
| 7,689,712 | B2 | 3/2010 | Lee et al. |
| 8,266,534 | B2 | 9/2012 | Curtis et al. |
| 8,423,369 | B2* | 4/2013 | Sato et al. .................. 704/270 |
| 8,457,959 | B2* | 6/2013 | Kaiser ......................... 704/231 |
| 8,698,872 | B2* | 4/2014 | Begeja et al. ............. 348/14.08 |
| 8,712,757 | B2* | 4/2014 | Hamilton et al. ................ 704/9 |
| 8,768,705 | B2* | 7/2014 | Sundararaman et al. .... 704/270 |
| 2002/0163548 | A1 | 11/2002 | Chiu et al. |
| 2003/0234772 | A1 | 12/2003 | Zhang et al. |
| 2004/0064322 | A1 | 4/2004 | Georgiopoulos et al. |
| 2004/0114746 | A1* | 6/2004 | Caspi ................. H04L 12/1831 379/202.01 |
| 2005/0034079 | A1 | 2/2005 | Gunasekar et al. |
| 2006/0233334 | A1 | 10/2006 | Bingaman et al. |
| 2007/0013945 | A1 | 1/2007 | Yoshida et al. |
| 2008/0133228 | A1* | 6/2008 | Rao .............................. 704/231 |
| 2008/0221893 | A1* | 9/2008 | Kaiser ......................... 704/257 |
| 2009/0119246 | A1* | 5/2009 | Kansal ............................. 707/2 |
| 2009/0222741 | A1 | 9/2009 | Shaw et al. |
| 2009/0271438 | A1 | 10/2009 | Agapi et al. |
| 2009/0276492 | A1* | 11/2009 | Bobbitt .................. G06Q 10/10 709/205 |
| 2010/0031142 | A1* | 2/2010 | Nagatomo .................... 715/254 |
| 2010/0191772 | A1 | 7/2010 | Brown et al. |
| 2011/0043652 | A1* | 2/2011 | King et al. ................ 348/222.1 |
| 2011/0099006 | A1* | 4/2011 | Sundararaman et al. .... 704/208 |
| 2011/0246183 | A1* | 10/2011 | Nagatomo ........................ 704/9 |
| 2012/0036210 | A1 | 2/2012 | Balajee |
| 2012/0166921 | A1* | 6/2012 | Alexandrov .......... G06F 17/212 715/202 |
| 2012/0191500 | A1 | 7/2012 | Byrnes et al. |
| 2012/0303370 | A1* | 11/2012 | Bangalore et al. ........... 704/249 |
| 2012/0311447 | A1 | 12/2012 | Chisa et al. |
| 2012/0329032 | A1 | 12/2012 | Fan et al. |
| 2012/0330648 | A1 | 12/2012 | Boguraev et al. |
| 2013/0035931 | A1 | 2/2013 | Ferrucci et al. |
| 2013/0036117 | A1 | 2/2013 | Fisher et al. |
| 2013/0179150 | A1* | 7/2013 | Eriksson et al. .................. 704/9 |
| 2013/0191719 | A1 | 7/2013 | Underhill et al. |
| 2014/0032677 | A1* | 1/2014 | Pittenger ............. H04L 12/1831 709/205 |
| 2014/0244252 | A1* | 8/2014 | Dines ................... G10L 15/183 704/235 |
| 2014/0278405 | A1 | 9/2014 | Peters et al. |
| 2014/0280186 | A1 | 9/2014 | Peters et al. |
| 2014/0282077 | A1 | 9/2014 | Wilson et al. |
| 2015/0066935 | A1 | 3/2015 | Peters et al. |

FOREIGN PATENT DOCUMENTS

| | | |
|---|---|---|
| CN | 104050221 A | 9/2014 |
| EP | 0413132 A2 | 2/1991 |
| EP | 1229454 A2 | 8/2002 |
| EP | 1672531 A2 | 6/2006 |
| EP | 1672531 A3 | 10/2008 |
| WO | 0213522 A2 | 2/2002 |

OTHER PUBLICATIONS

U.S. Appl. No. 13/838,731,Non-Final Office Action, dated Mar. 16, 2015, 17 pg.
U.S. Appl. No. 14/523,250, Non-Final Office Action, dated Mar. 13, 2015, 10 pg.
U.S. Appl. No. 13/839,038, Final Office Action, dated May 26, 2015, 13 pg.
U.S. Appl. No. 13/839,038, Examiner's Answer, dated Feb. 3, 2016, 11 pg.
U.S. Appl. No. 13/838,731, Final Office Action, dated Sep 4. 2015, 20 pg.
U.S. Appl. No. 13/838,731, Examiner's Answer, dated Jul. 15, 2016, 27 pg.
U.S. Appl. No. 14/523,250, Final Office Action, dated Sep. 4, 2015, 11 pg.
U.S. Appl. No. 14/523,250 Examiner's Answer, dated Jul. 13, 2016, 14 pg.
U.S. Appl. No. 13/838,731 Decision on Appeal, May 1, 2017, 14 pg.
U.S. Appl. No. 13/838,731 Decision on Request for Reconsideration, Jul. 18, 2017, 17 pg.
U.S. Appl. No. 13/838,731, Non-Final Office Action, dated Nov. 2, 2017, 27 pg.
U.S. Appl. No. 14/523,250, Decision on Appeal, Apr. 28, 2017, 11 pg.
U.S. Appl. No. 14/523,250, Decision on Request for Rehearing, Jul. 18, 2017, 14 pg.
U.S. Appl. No. 14/523,250, Non-Final Office Action, dated Oct. 19, 2017, 16 pg.
U.S. Appl. No. 13/839,038, Decision on Appeal, Apr. 28, 2017, 10 pg.
U.S. Appl. No. 13/839,038, Decision on Request for Rehearing, Aug. 2, 2017, 8 pg.
U.S. Appl. No. 13/839,038, Non-Final Office Action, dated Oct. 20, 2017, 13 pg.

* cited by examiner

200

```
Converting the one or more meeting content
streams in a non-text format into text, whereby the
plurality of meeting content streams are in text
205
```

```
Analyzing the text of the plurality of meeting
content streams to identify a key element therein
210
```

```
Generating consolidated system notes that includes
the key element
215
```

AUTOMATIC NOTE TAKING WITHIN A VIRTUAL MEETING

CROSS-REFERENCE TO RELATED APPLICATIONS

This application is a Continuation of U.S. application Ser. No. 13/839,038, filed on Mar. 15, 2013, the entirety of which is incorporated herein by reference.

BACKGROUND

Arrangements described herein relate to note taking within a virtual meeting.

Advances in communications and information technology have allowed for greater collaboration and streamlined processes within an organization. As a result, the need for an individual's physical presence has been reduced in at least some situations. For instance, meetings between two or more individuals are a regular part of any organizational environment. When meeting participants are located in different locations, an in-person meeting may not be practical. Instead, a meeting can be conducted virtually such that the two or more participants interact with one another remotely.

Taking notes or meeting minutes is still a manual process to which a person is assigned. A common challenge for virtual meeting participants is keeping up with a presentation while taking notes and correlating them with the correct part of the presentation. For example a user who has been designated note taker may find an interesting point and takes a note. However, during the time it takes the person to write the note, the presentation has moved on and other noteworthy points may be lost. Further, after the presentation, someone reviewing the notes must manually cross reference the notes with the original presentation.

BRIEF SUMMARY

One or more embodiments disclosed within this specification relate to virtual meetings and, more particularly, to automatically taking notes within a virtual meeting.

An embodiment can include a method of automatically taking notes in a virtual meeting. The virtual meeting includes meeting content, which can include a plurality of meeting content streams. One or more of the meeting content streams can be in a non-text format. The method can include converting the one or more meeting content streams in a non-text format into text. As a result, the plurality of meeting content streams is in text. The method can further include analyzing the text of the plurality of meeting content streams to identify a key element therein. Further, the method can include generating consolidated system notes that include the key element. The converting and analyzing can be performed by a processor.

Another embodiment can include a system for automatically taking notes in a virtual meeting. The virtual meeting can include meeting content, which can include a plurality of meeting content streams. One or more of the meeting content streams can be in a non-text format. The system can have a processor. The processor can be configured to initiate executable operations. The executable operations can include converting the one or more meeting content streams in a non-text format into text. Thus, the plurality of meeting content streams is in text. Further, the executable operations can include analyzing the text of the plurality of meeting content streams to identify a key element therein. The executable operations can also include generating consolidated system notes that include the key element.

Another embodiment can include a computer program product for automatically taking notes in a virtual meeting having meeting content including a plurality of meeting content streams. One or more of the meeting content streams can be in a non-text format. The computer program product can include a computer-readable storage medium having stored thereon program code that, when executed, configures a processor to perform a method. The method can include, by the processor, converting the one or more meeting content streams in a non-text format into text. Thus, the plurality of meeting content streams is in text. The method can further include analyzing, by the processor, the text of the plurality of meeting content streams to identify a key element therein. The method can also include, by the processor, generating consolidated system notes that include the key element.

BRIEF DESCRIPTION OF THE SEVERAL VIEWS OF THE DRAWINGS

FIG. 2 is a flow chart illustrating a method of automatically taking notes in a virtual meeting in accordance with one embodiment disclosed within this specification.

DETAILED DESCRIPTION

Figure 1:
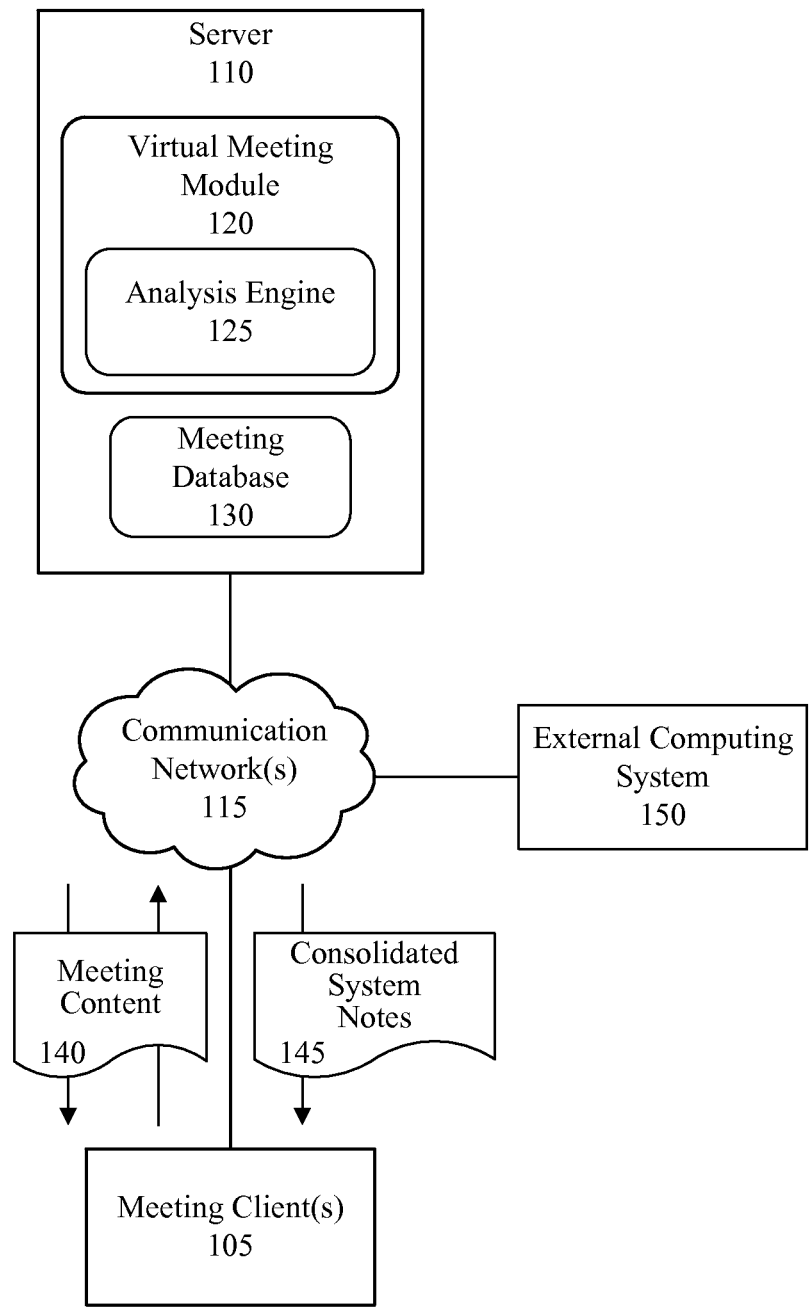
FIG. 1 is a block diagram illustrating a system for automatically taking notes in a virtual meeting in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 depicts a block diagram illustrating a system 100 for automatically taking notes in a virtual meeting in accordance with one embodiment disclosed within this specification. A virtual meeting can be a virtual environment in which two or more virtually represented attendees (e.g. persons) can communicate using a communication network. Examples of ways in which virtual meetings can occur include teleconferences, web-conferencing, online collaboration, instant messaging, video conferencing, voice conferencing, desktop/computer sharing. A virtual meeting can include a plurality of meeting attendees, which can include the meeting chair(s), meeting presenter(s), and meeting participant(s). In the virtual meeting, two or more virtually represented attendees can communicate audio, video, graphics, images, data, file documents, texts, etc. A virtual meeting can be implemented for a meeting in which at least some of the attendees are physically located within the same location, room, or meeting place. In some instances, a virtual meeting can be implemented for a meeting in which at least at least some of the meeting attendees are located remotely from each other, thereby allowing the meeting attendees to interact with one another remotely.

The system 100 can include one or more clients 105 and one or more servers 110. The system 100 further can include a virtual meeting module 120, an analysis engine 125 and a meeting database 130. While the virtual meeting module 120, the analysis engine 125 and the meeting database 130 are shown in FIG. 1 as being components of the sever 110, it will be understood that one or more of these items can be executed on and/or distributed among other processing systems to which the server 110 is communicatively linked.

The various components of system 100 can be communicatively linked through one or more communication networks 115. As used herein, the term "communicatively linked" can include direct or indirect connections through a communication channel or pathway or another component or system. A "communication network" means one or more components designed to facilitate the delivery of information from one source to another.

The one or more communication networks 115 can be implemented as, or include, without limitation, a wide area network (WAN), wireless wide area network (WWAN), a local area network (LAN), wireless local area network (WLAN), the Internet, the Public Switched Telephone Network (PSTN), a wireless network, a mobile network, a Virtual Private Network (VPN), the Internet, and/or one or more intranets. The communication network(s) 115 can include any combination of the above networks and/or other types of networks. The communication network(s) 115 can include one or more routers, switches, access points, wireless access points, and/or the like.

The system 100 can include one or more meeting clients 105 used by one or more users. The meeting client(s) 105 can be implemented as any of a variety of communication devices executing suitable communication software. The meeting client(s) can be any suitable device that can allow a user to access a virtual meeting. Each meeting client 105 can be implemented as a computer system or other information processing system. One or more of the meeting clients 105 may also be implemented as a portable or mobile computing device, e.g., a mobile telephone, a smart phone, a wireless-enabled personal digital assistant, a portable computer, e.g., laptop, tablet or the like.

Each client 105 can include and/or execute suitable communication software, which enables the client 105 to communicate with the server 110 and/or other clients 105 through the communication network 115 and perform the functions disclosed herein. For instance, the meeting client(s) 105 can be an IM client, an electronic mail client, an SMS client, a system client, a telecommunication system client, a telephone client (e.g. Voice over Internet Protocol (VoIP) system), videoconference client, etc. In some instances, the one or more meeting client(s) 105 can be configured to communicate via a wireless and/or wired medium.

The system 100 can include one or more servers 110, which can be communicatively linked to the one or more meeting clients 105 via one or more communication networks 115. The one or more servers 110 can be implemented as, for example, a virtual meeting system. In this regard, the one or more servers 110 can be implemented as a virtual meeting server or other communication hub or server capable of executing a virtual meeting within or as part of the communication network 115. In any case, the one or more servers 110 can include suitable operational software for performing the various functions described herein.

The system 100 can include a virtual meeting module 120 and a meeting database 130. The virtual meeting module 120 and/or the meeting database 130 can be stored and/or executed on the server 110. Alternatively, the virtual meeting module 120 and/or the meeting database 130 can be stored and/or executed on another system to which the server 110 is communicatively linked. As an example, the virtual meeting module 120 and/or the meeting database can be stored and/or executed on one or more of the meeting clients 105.

The virtual meeting module 120 can be implemented as computer readable program code that, when executed by a processor, implement the various processes described herein. The virtual meeting module 120 can facilitate the conducting of a virtual meeting in various ways. For instance, the virtual meeting module 120 can start, conduct, and/or terminate the virtual meeting session. The virtual meeting module 120 can process data to identify attendees, data related to a presentation within the virtual meeting, data related to a meeting topic within the virtual meeting, a need for a virtual meeting, provide agenda tracking, identify the meeting clients used by attendees to communicate with the virtual meeting. The virtual meeting module 120 can provide automated data archiving, capture during the virtual meeting that can track virtual meeting minutes.

The virtual meeting module 120 can allow users to participate in the virtual meeting via any suitable means. For instance, meeting attendees can submit meeting content 140 to and receive meeting content 140 from the virtual meeting. The meeting content 140 can include, for example, messaging (e.g. chat, instant messaging), video and/or audio data. The meeting content 140 can be transmitted across one or more channels or streams. The virtual meeting module 120 can record data transmitted across these meeting content channels or streams.

The virtual meeting module 120 can be configured to convert the meeting content 140 from one form of data to another. For instance, meeting content 140 received in audio and/or video data formats can be converted to text. To that end, the virtual meeting module 120 can include any known voice recognition, transcription, dictation, speech-to-text or other conversion software. The virtual meeting module 120 can convert one or more components of the meeting content 140 so that the meeting content is in the same data format. As an example, the data of the audio, video and/or messaging streams can be converted to text or a textual representation.

The virtual meeting module 120 can collect data relevant to the virtual meeting. The data can be collected in any suitable manner by the virtual meeting module 120. For instance, the virtual meeting module 120 can be configured to record at least a portion of the virtual meeting, including the meeting content 140 (e.g., one or more of the audio, video and/or messaging streams). The collected data can be stored in the virtual meeting database 130.

The virtual meeting module 120 can be configured to link the meeting content 140 to the data extracted therefrom (e.g., the text of the audio, video and/or messaging channels). Such linking can be performed in any suitable manner. For instance, the linking can include tagging the meeting content 140 with a timestamp to indicate when each portion of the meeting content 140 was made. Meeting content 140 within the virtual meeting associated with the timestamp (e.g. recording the audio, video and messaging/chat streams associated with that time stamp) can be recorded. The data or notes extracted or generated from the meeting content 140 can be linked or otherwise associated with virtual meeting content 140 having the same timestamp. Such linking can allow quick recall of meeting content 140 occurring during that timestamp.

The system 100 can include an analysis engine 125. The analysis engine 125 can be stored and/or executed on the server 110 and/or the virtual meeting module 120. Alternatively, the analysis engine 125 can be stored and/or executed on another system to which the server 110 and/or the virtual meeting module 120 is communicatively linked. The analysis engine 125 can be implemented as computer readable program code that, when executed by a processor, implement the various processes described herein.

The analysis engine 125 can analyze data collected during a virtual meeting in various ways. For instance, analysis engine 125 can analyze the meeting content 140, including the data extracted therefrom (e.g., the text of the audio, video and/or messaging channels). Such analysis can occur in any suitable form. For instance, the analysis engine 125 can analyze the meeting content 140 using any known natural language processing system or technique. Natural language processing can includes analyzing each user's notes for topics of discussion, deep semantic relationships and keywords. Natural language processing can also include semantics detection and analysis and any other analysis of data including textual data and unstructured data. Semantic analysis can include deep and/or shallow semantic analysis. Natural language processing can also include discourse analysis, machine translation, morphological segmentation, named entity recognition, natural language understanding, optical character recognition, part-of-speech tagging, parsing, relationship extraction, sentence breaking, sentiment analysis, speech recognition, speech segmentation, topic segmentation, word segmentation, stemming and/or word sense disambiguation. Natural language processing can use stochastic, probabilistic and statistical methods The analysis engine 125 can perform sophisticated indexing of the meeting content 140. The analysis engine 125 can cross-reference the meeting content 140 to extract key elements therefrom. A "key element" is a concept, topic, keyword, key phrase or noteworthy point that meets a predetermined threshold of significance. In one implementation, the analysis engine 125 can be configured to identify key elements by detecting commonalities within one or more channels of the meeting content 140. The analysis engine 125 can use the key elements to generate consolidated system notes 145 for later consumption by other meeting attendees or others who wish to have an overview of the meetings core concepts.

At any point during a virtual meeting, one or more meeting attendees can initiate an automatic note taking session. One or more user interface elements can be presented to the virtual meeting attendees to enable a user to initiate note taking. As used herein, a "user interface element" is defined as a component or a group of components that enables a user to interact with a machine. For instance, the user interface element can be a graphical user interface element, such as a button. The notes can be generated using any suitable content source from the virtual meeting, including, for example, the meeting content 140.

The meeting content 140 (e.g., video stream, audio stream, messaging stream and/or other meeting content streams) can be monitored. The meeting content 140 can be saved or recorded in any suitable manner. A timestamp of when the meeting content 140 was input can be captured. One or more streams of the meeting content 140 can be converted, if necessary, to text or a textual representation. The timestamp associated with the meeting content 140 can be associated with data extracted from the meeting content 140 (e.g., the text of the audio, video and/or messaging channels). The virtual meeting module 120 can consolidate all meeting content 140. Such consolidation can occur at any suitable point of time, such as after the virtual meeting is finished.

The analysis engine 125 can be configured to analyze the meeting content 140. The analysis engine 125 can be configured to perform natural language processing on the meeting content 140. For instance, the analysis engine 125 can analyze the meeting content 140 for topics of discussion, deep semantic relationships and keywords that are common across a plurality of notes. Based on such analysis, the analysis engine 125 can index and/or cross-reference the meeting content 140 to extract key elements therefrom. For instance, key elements can be extracted using significance scoring based on time spent on the point, the appearance of the point in multiple meeting content streams, commonalities of the notes, etc. One or more key elements may be extracted from the meeting content 140 of one of the meeting content streams in isolation, or one or more key elements may be inferred based on common occurrences of the key element(s) across a plurality of the meeting content streams. Further, the virtual meeting module 120 can be configured to analyze the semantics of the meeting content 140 to detect key elements.

The analysis engine 125 and/or the virtual meeting module 120 can organize the detected key elements in any suitable manner, such as by logical similarity and/or topic. The analysis engine 125 and/or the virtual meeting module 120 can consolidate at least a subset of the detected key elements into consolidated system notes 145. The consolidated system notes 145 can have any suitable form. In one implementation, the consolidated system notes 145 can be grouped under main topics by conceptual similarity using any suitable natural language analysis.

The system can be configured to detect noteworthy points from the meeting content stream. For instance, the system can analyze the structure of content in meeting slides to identify key elements. For instance, the system can detect slide titles, offset text (e.g., bold, italicized, underlined, colored, highlighted, larger font), etc. The system can detect key elements from meeting events, including, for example, application switches, slide back tracking, and highlighting text as the presenter speaks.

The system can detect overlapping content across multiple slides. Such overlapping content may suggest a key element. The system can include any suitable screen scrape software to extract available text from the video stream (e.g. the meeting slides) for semantic analysis.

The system can detect key elements from the conference's audio stream. The system may convert available audio data to text for textual analysis. The system can detect questions posed by the meeting attendees. The system can detect the number of participants on a topic. The greater the number of participants can indicate a higher interest in the topic and, therefore, a key element. The system can detect fluctuations in an aspect of the speaker's voice (e.g., tone, volume, intensity, etc.) as an indicator of whether the topic is a key element.

The system can detect key elements from the messaging stream of the virtual meeting. During a virtual meeting, conversations often occur in parallel to the main presentation via a messaging stream. The system can monitor the content of the messaging stream to identify questions and answers among the meeting attendees. Such questions and answers can be used to detect or determine key elements of the virtual meeting.

The system can cross-reference the available information from the meeting content 140 to detect common key elements that are worthy for inclusion in a set of notes for the meeting. The system can compare each of the meeting content streams using conventional natural language processing. Common topics/concepts/language can be indicative of a key element. For instance, a slide may state that "sales are up 40%." In parallel, a meeting attendee may ask a question in a messaging stream "What is the timeframe of these sales numbers?" The system may detect an association between the slide content and the chat content and determine that content, question and ensuing answer are key elements.

The consolidated system notes 145 can include links back to the associated the meeting content 140. For example, the consolidated system notes 145 can present key elements that provide links back to the underlying recording of one or more content streams of the meeting content 140 from which the notes were extracted. The linking of the consolidated system notes 145 to the original meeting content 140 can include linking the notes to surrounding meeting content 140 to provide context. Thus, the linking can include the presentation of sub-notes to a relevant portion of the source material from which the key element was extracted.

The system can index one or more of the meeting content streams to correlate a short recording with each note in the consolidate system notes 145. The system may automatically link a portion (e.g. 30 seconds or other suitable time period) of the recorded data stream to provide a user with context for each note. The system may consolidate semantically or conceptually similar notes. The notes from each data stream of the meeting content 140 can be captured and presented as sub-notes. Such sub-notes may index to the corresponding recordings of the meeting content 140 to provide additional context. As an example, a first note from the messaging stream can be related to a second note from the video stream. The system may consolidate these notes under a single summary note in the consolidated system notes 145. However, the first and second notes can be presented as sub-notes under the summary note. The first note may further link to the associated recording of the messaging stream, and the second note may further link to the associated recording of the video stream.

Each key element may link to individual content streams that relate to that key element. The virtual meeting module 120 may link the key elements to recordings of meeting content 140 that occurred at or near the same time. As an example, the virtual meeting module 120 can tag each of the meeting content 140 with a timestamp indicating when each portion of the meeting content was made. The virtual meeting module 120 can record meeting content 140 within the virtual meeting associated with that timestamp, including audio, video, and chat streams. The virtual meeting module 120 can link the notes or key elements extracted from the meeting content with the actual meeting content 140, allowing quick recall of audio, video, chat and/or other data streams during that time.

The meeting content 140 and/or the consolidated system notes 145 can be stored in a database, such as meeting database 130. Alternatively or in addition, the meeting content 140 and/or the consolidated system notes 145 can be published. "Published" means that the information is made available or accessible for users to consume. The meeting content 140 and/or the consolidated system notes 145 can be published to the meeting attendees, or they can be published to one or more non-attendees as well. As an example, the meeting content 140 and/or the consolidated system notes 145 can be published by distributing them to a predefined list of recipients, such as by a message (e.g. electronic mail). In one embodiment, the meeting content 140 and/or the consolidated system notes 145 can be published to the meeting participants and/or to other interested parties. In such case, the meeting content 140 and/or the consolidated system notes 145 can be embedded in the message itself, included as an attachment to the message or the message can provide directions to access the meeting content 140 and/or the consolidated system notes 145 (such as a hyperlink or URL). As another example, the meeting content 140 and/or the consolidated system notes 145 can be published to an external computing system 150. "External computing system" is any computing system that is external to and/or independent of the virtual meeting. Examples of external computing systems 150 include a social collaboration system or website. Publication of the meeting content 140 and/or the consolidated system notes 145 can facilitate convenient review.

FIG. 2 is a flow chart illustrating a method 200 of automatically taking notes in a virtual meeting. The virtual meeting includes meeting content, which can include a plurality of meeting content streams. One or more of the meeting content streams can be in a non-text format.

At step 205, the one or more meeting content streams in a non-text format can be converted into text. As a result, the plurality of meeting content streams is in text. At step 210, the text of the plurality of meeting content streams can be analyzed to identify a key element therein. Such analyzing can include natural language processing. At step 215, consolidated system notes can be generated. The consolidated system notes can include the key element.

Examples of implementations of the system 100 will now be presented. In one example, the system 100 can be used in an organization in which a virtual meeting is conducted. For instance, a virtual meeting can be held to present a company's financial data. The presentation may include slides which present information, data and content to this topic. The virtual meeting can be configured to enable meeting attendees to input meeting content. To that end, the virtual meeting can include an integrated video stream, audio stream (e.g. telephone) and message stream (e.g. chat/instant messaging).

During the virtual meeting, one or more slides may be presented. As an example, one slide may be titled "Sales this Year." A bulleted item on the slide may indicate that sales have increased by 8% in the current year. A first meeting attendee may submit meeting content via a first meeting content stream. For instance, the first meeting attendee may ask a question on a messaging stream. As an example, the question may be "For comparison, what were sales last year?" A second meeting attendee may submit meeting content via a second content stream. For example, the second meeting attendee may respond to the question by an audio stream (e.g., telephone). As an example, the second meeting attendee may say, "Sales declined 3% last year."

The system can collect and save the meeting content submitted by meeting attendees across all meeting content streams. The system can convert the meeting content streams into text. The system can analyze the individual notes. The system can detect key elements by identifying the commonalities of the notes. In this instance, the system can automatically identify that these notes contain substantially similar content, namely, sales data from the current year and the previous year.

The system can automatically generate notes for the virtual meeting. The note can be based on the meeting slide and/or the notes from the meeting attendees. In this example, one note can be "Sales this Year" as extracted from the slide title. Under this note, the system can record a bullet point with related information (e.g. "sales are up 8% this year"), which can be extracted from the slide or other source. The system may record additional bullet points based on the content streams from the meeting attendees. In this example, an example of a bullet point could be: "sales declined 3% last year" as taken from the messaging stream question and the audio stream answer.

The consolidated system notes 150 can include one or more links back to the associated meeting content 140 from which the notes were extracted. The linking of the consolidated system notes 150 to the original meeting content 140 from which the notes were generated can include linking one or more aspects of the consolidated system notes to the original meeting content including surrounding meeting context to provide context. As an example, the meeting module can tag meeting content with a timestamp indicating when the meeting content occurred. The meeting module can record activity within the conferencing system associated with that timestamp, including audio, video, and chat streams. The meeting module can link the consolidated system notes with the virtual meeting's activity, allowing quick recall of audio, video, and chat streams during that time.

The consolidated system notes can be generated automatically. In some instances, the consolidated notes may exclude one or more of the individual notes extracted from one or more of the content streams during the virtual meeting. For instance, if only one note on a particular point or topic was detected in one of the meeting content streams, that user note may be disregarded in the consolidated system notes due to a lack of commonality with any of the other notes on that point or topic detected in the meeting content streams. Alternatively or in addition, a note may be disregarded in the consolidated system notes due to a lack of a sufficient level of commonality with other notes on that point or topic input.

The consolidated system notes can be published for others to consume, regardless of whether they attended the virtual meeting. Thus, members of the company who were not able to attend the virtual meeting can review the consolidated system notes to get at least a sense of the key points of the virtual meeting. Further, a meeting attendee who may have missed a portion of the virtual meeting (e.g., due to not being able to take notes fast enough, distraction or being been temporarily called away from the virtual meeting) can review the consolidated system notes to obtain key points that they may have missed.

Figure 3:
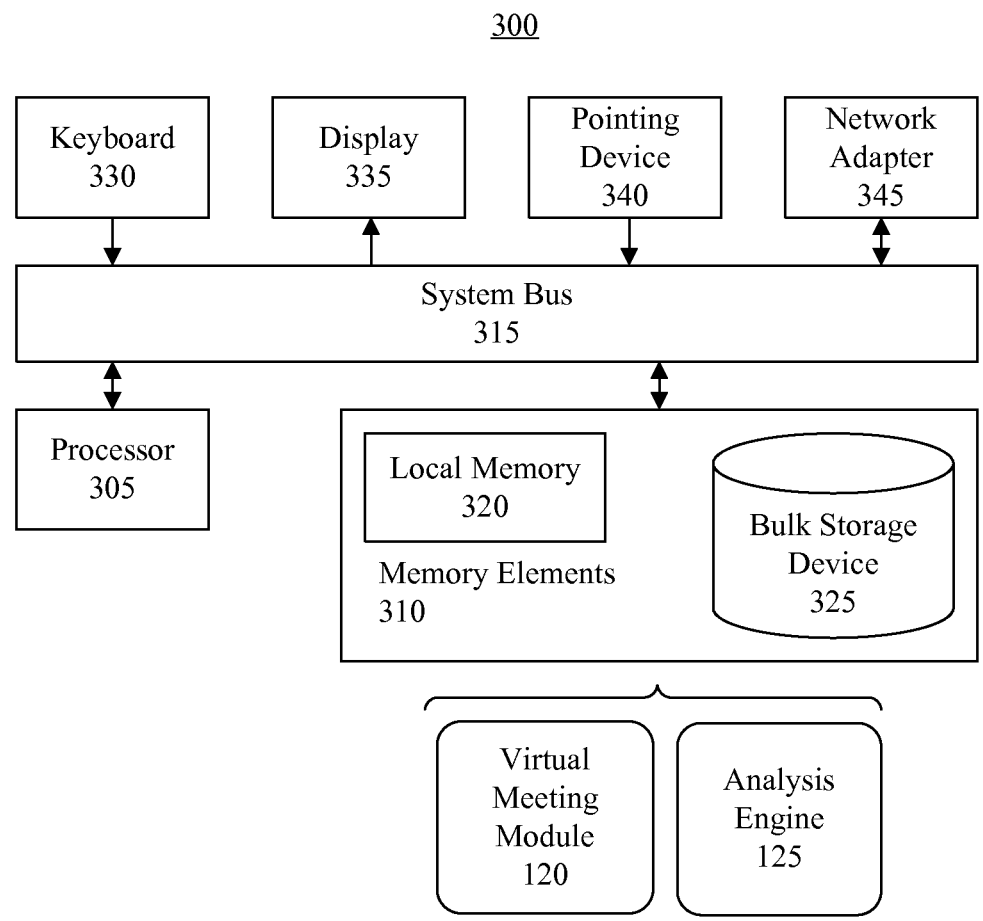
FIG. 3 is a block diagram illustrating a system for automatically taking notes in a virtual meeting in accordance with one embodiment disclosed within this specification.

FIG. 3 is a block diagram illustrating an example of a data processing system 300. System 300 can include at least one processor (e.g., a central processing unit) 305 coupled to memory elements 310 through a system bus 315 or other suitable circuitry. As such, system 300 can store program code within memory elements 310. Processor 305 executes the program code accessed from memory elements 310 via system bus 315 or the other suitable circuitry.

In one aspect, system 300 is implemented as a computer or other programmable data processing apparatus that is suitable for storing and/or executing program code. It should be appreciated, however, that system 300 can be implemented in the form of any system including a processor and memory that is capable of performing and/or initiating the functions and/or operations described within this specification. Further, system 300 can be implemented in any of a variety of different form factors including, but not limited to, a portable device such as a mobile communication device, a tablet computing and/or communication device, a laptop computing device, a desktop computing device, a server, or the like.

Memory elements 310 include one or more physical memory devices such as, for example, local memory 320 and one or more bulk storage devices 325. Local memory 320 refers to RAM or other non-persistent memory device(s) generally used during actual execution of the program code. Bulk storage device(s) 325 can be implemented as a hard disk drive (HDD), solid state drive (SSD), or other persistent data storage device. System 300 also can include one or more cache memories (not shown) that provide temporary storage of at least some program code in order to reduce the number of times program code must be retrieved from bulk storage device 325 during execution.

Input/output (I/O) devices such as a keyboard 330, a display 335, and a pointing device 340 optionally can be coupled to system 300. The I/O devices can be coupled to system 300 either directly or through intervening I/O controllers. One or more network adapters 345 also can be coupled to system 300 to enable system 300 to become coupled to other systems, computer systems, remote printers, and/or remote storage devices through intervening private or public networks. Modems, cable modems, wireless transceivers, and Ethernet cards are examples of different types of network adapters 345 that can be used with system 300.

As pictured in FIG. 3, memory elements 310 can store the virtual meeting module 120 and/or the analysis engine 125. The virtual meeting module 120, being implemented in the form of executable program code, is executed by system 300 and, as such, is considered an integrated part of system 300. Moreover, the virtual meeting module 120, including any parameters and/or attributes utilized by module 120, are functional data structures that impart functionality when employed as part of system 300. The analysis engine 125, being implemented in the form of executable program code, is executed by system 300 and, as such, is considered an integrated part of system 300. Moreover, the analysis engine 125, including any parameters and/or attributes utilized by engine 125, are functional data structures that impart functionality when employed as part of system 300.

The consolidated notes 145 can be output to, and stored within, memory elements 310. As used herein, "outputting" and/or "output" can mean storing in memory elements 310, for example, writing to a file stored in memory elements 310, writing to display 335 or other peripheral output device, playing audible notifications, sending or transmitting to another system, exporting, or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method within a computer hardware system, comprising:
    receiving first non-textual data, over a first communication channel, from a first client device associated with a first participant of a virtual meeting from which the first non-textual data was generated as a first portion of meeting content;
    receiving second non-textual data, over a second communication channel, from a second client device associated with a second participant of the virtual meeting from which the second non-textual data was generated as a second portion of meeting content;
    extracting, using a significance analysis of the first non-textual data, at least one key element associated with the first non-textual data;
    extracting, using the significance analysis of the second non-textual data, at least one key element associated with the second non-textual analysis;
    comparing the at least one key element extracted from the first non-textual data with the at least key element extracted from the second non-textual data to identify a common key element that is common to both the first and second non-textual data; and
    generating consolidated system notes that include the common key element, wherein
    the significance analysis establishing that each key element meets a predetermined threshold of significance.

2. The method of claim 1, wherein
the first and second non-textual data are converted into the first and second textual data using natural language processing.

3. The method of claim 1, wherein
the consolidated system notes are published by the computer hardware system.

4. The method of claim 1, wherein
a portion of the meeting content is excluded from the consolidated meeting notes.

5. The method of claim 4, wherein
the portion of the meeting context excluded from the consolidated meeting notes is excluded based upon lack of commonality with other meeting content.

6. The method of claim 1, wherein
the common key element, within the consolidated system notes, includes a link to at least a portion of the first and second non-textual data that are stored within a database, and
the portion, to which the link is directed, includes a relevant portion of the first and second non-textual data from which the common key element was extracted.

7. The method of claim 6, wherein
user activation of the link, within the consolidated system notes, causes the relevant portion of the first and second non-textual data from which the common key element was extracted to be presented.

8. The method of claim 7, wherein
the relevant portion of the first and second meeting content streams from which the common key element was extracted is in a non-text format, and
the user activation of the link causes the presentation of the relevant portion in the non-text format.

9. The method of claim 1, wherein
the portion of the first and second non-textual data is tagged with a timestamp to indicate when the portion was made.

10. The method of claim 1, wherein
the consolidated system notes are published along with the meeting content of the virtual meeting.

* * * * *